(12) United States Patent
Ostroverkhov et al.

(10) Patent No.: US 9,478,245 B2
(45) Date of Patent: Oct. 25, 2016

(54) REPLICATION AND FORMATTING METHOD AND SYSTEM FOR BIT-WISE HOLOGRAPHIC STORAGE

(75) Inventors: Victor Petrovich Ostroverkhov, Ballston Lake, NY (US); Pierino Gianni Bonanni, Loudonville, NY (US); Xiaolei Shi, Niskayuna, NY (US); Zhiyuan Ren, Malta, NY (US); Hua Xia, Niskayuna, NY (US); Xuefeng Wang, Schenectady, NY (US); Xinghua Wang, Clifton Park, NY (US)

(73) Assignee: General Electric Company, Schnectady, NY (US)

(*) Notice: Subject to any disclaimer, the term of this patent is extended or adjusted under 35 U.S.C. 154(b) by 421 days.

(21) Appl. No.: 12/907,824

(22) Filed: Oct. 19, 2010

(65) Prior Publication Data

US 2012/0092980 A1    Apr. 19, 2012

(51) Int. Cl.
*G11B 7/08*   (2006.01)
*G11B 7/28*   (2006.01)

(52) U.S. Cl.
CPC *G11B 7/083* (2013.01); *G11B 7/28* (2013.01)

(58) Field of Classification Search
None
See application file for complete search history.

(56) References Cited

U.S. PATENT DOCUMENTS

| | | |
|---|---|---|
| 5,684,611 A | 11/1997 | Rakuljic |
| 5,808,986 A | 9/1998 | Jewell et al. |
| 7,187,481 B1* | 3/2007 | Sigel et al. ............ 359/28 |
| 7,254,105 B2* | 8/2007 | El Hafidi et al. ......... 369/103 |
| 2002/0015376 A1* | 2/2002 | Liu et al. ............ 369/103 |
| 2005/0254392 A1* | 11/2005 | Meyrueis et al. ....... 369/112.01 |
| 2008/0106996 A1* | 5/2008 | Kim et al. ............ 369/112.12 |
| 2008/0239922 A1* | 10/2008 | Fujita et al. ............ 369/103 |
| 2009/0080317 A1* | 3/2009 | Martinez ............ 369/103 |
| 2010/0054103 A1* | 3/2010 | Tatsuta et al. ............ 369/103 |
| 2010/0157773 A1* | 6/2010 | Welles et al. ............ 369/103 |
| 2010/0157774 A1 | 6/2010 | Ren et al. |

FOREIGN PATENT DOCUMENTS

EP    2187391 A1    5/2010
(Continued)

OTHER PUBLICATIONS

U.S. Appl. No. 12/949,621, filed Nov. 18, 2010, Xuefeng Wang et al.
U.S. Appl. No. 12/949,628, filed Nov. 18, 2010, Xuefeng Wang et al.
U.S. Appl. No. 12/905,853, filed Oct. 15, 2010, Xinghua Wang et al.
(Continued)

*Primary Examiner* — Paul Huber
(74) *Attorney, Agent, or Firm* — Jean K. Testa; Fletcher Yoder, P.C.

(57) ABSTRACT

The present techniques provide methods and systems for recording micro-holograms on a holographic disk using a plurality of counter-propagating light beams in parallel. The parallel counter-propagating light beams overlap to form interference patterns on a data layer and over multiple data tracks in the holographic disk. Rotating the disk enables the parallel recording of micro-holograms over multiple data tracks, thus reducing recording time. Further, the illumination pattern may include illuminated spots and non-illuminated regions, such that each illumination spot may cover a relatively small fraction of the data layer plane, possibly controlling the depth spread of the recorded micro-hologram. In some embodiments, data in the parallel signal beams may be retrieved from a master holographic disk or may be modulated into the parallel signal beams.

27 Claims, 6 Drawing Sheets

(56) References Cited

FOREIGN PATENT DOCUMENTS

| | | | |
|---|---|---|---|
| EP | 2202734 | A1 | 6/2010 |
| EP | 2204799 | A1 | 7/2010 |
| JP | 2008305509 | A | 12/2008 |
| TW | 200929203 | A | 7/2009 |
| WO | 2009122987 | A1 | 10/2009 |

OTHER PUBLICATIONS

EP Search Report and Opinion dated Feb. 20. 2012 from corresponding EP Application No. 11184108.6.

TW Office Action Mailed Aug. 11, 2015.

Japanese Application No. 2011-220570 Office Action Dated Jan. 27, 2015; 1pg.

* cited by examiner

FIG. 4
(MULTIPLE PICKUPS)

FIG. 5
(MULTIPLE CHANNELS
IN A SINGLE PICKUP)

REPLICATION AND FORMATTING METHOD AND SYSTEM FOR BIT-WISE HOLOGRAPHIC STORAGE

BACKGROUND

The present techniques relate generally to bit-wise holographic data storage techniques. More specifically, the techniques relate to methods and systems for parallel replication in optical disks.

As computing power has advanced, computing technology has entered new application areas, such as consumer video, data archiving, document storage, imaging, and movie production, among others. These applications have provided a continuing push to develop data storage techniques that have increased storage capacity and increased data rates.

One example of the developments in data storage technologies may be the progressively higher storage capacities for optical storage systems. For example, the compact disc, developed in the early 1980s, has a capacity of around 650-700 MB of data, or around 74-80 minutes of a two channel audio program. In comparison, the digital versatile disc (DVD) format, developed in the early 1990s, has a capacity of around 4.7 GB (single layer) or 8.5 GB (dual layer). Furthermore, even higher capacity storage techniques have been developed to meet increasing demands, such as the demand for higher resolution video formats. For example, high-capacity recording formats such as the Blu-ray Disc™ format is capable of holding about 25 GB in a single-layer disk, or 50 GB in a dual-layer disk. As computing technologies continue to develop, storage media with even higher capacities may be desired. Holographic storage systems and micro-holographic storage systems are examples of other developing storage technologies that may achieve increased capacity requirements in the storage industry.

Holographic storage is the storage of data in the form of holograms, which are images of three dimensional interference patterns created by the intersection of two beams of light in a photosensitive storage medium. Both page-based holographic techniques and bit-wise holographic techniques have been pursued. In page-based holographic data storage, a signal beam containing digitally encoded data (e.g., a plurality of bits) is superposed on a reference beam within the volume of the storage medium resulting in a chemical reaction which modulates the refractive index of the medium within the volume. Each bit is therefore generally stored as a part of the interference pattern. In bit-wise holography or micro-holographic data storage, every bit is written as a micro-hologram, or Bragg reflection grating, typically generated by two counter-propagating focused recording beams. The data are then retrieved by using a read beam to reflect off the micro-hologram to reconstruct the recording beam.

Holographic storage systems provide much higher storage capacities than prior optical systems. However, due in part to the small physical size of micro-holograms and the closely spaced tracks and/or layers in a storage medium (e.g., an optical disk), the two counter-propagating beams are dynamically overlapped for accurate and efficient micro-hologram recording. Simpler or more efficient techniques for recoding an optical disk with micro-holograms may be advantageous.

BRIEF DESCRIPTION

An embodiment of the present techniques provides a method for recording data on a holographic disk. The method includes emitting a plurality of signal beams toward a first side of the holographic disk and emitting a plurality of reference beams toward a second side of the holographic disk such that each signal beam in the plurality of parallel signal beams substantially overlaps with a corresponding reference beam in the plurality of reference beams. The first side and the second side are on opposite sides of the disk.

Another embodiment provides a system for recording micro-holograms on a holographic disk. The system includes one or more signal heads configured to transmit a plurality of signal beams in parallel towards a first side of the holographic disk and one or more reference heads configured to transmit a plurality of reference beams in parallel towards a second side of the holographic disk. The first side is opposite from the second side.

Another embodiment provides a method for pre-populating a holographic disk with micro-holograms. The method includes illuminating the holographic disk with a first pair of counter-propagating beams to produce a first illuminated spot on a first track of the holographic disk and illuminating the holographic disk with a second pair of counter-propagating beams in parallel with the illumination of the first pair of counter-propagating beams to produce a second illuminated spot on a second track of the holographic disk.

Still another embodiment provides a holographic disk comprising a substrate comprising a substantially planar slab of recordable holographic material, a plurality of data layers formed in the substrate, and a plurality of parallel data tracks on each of the plurality of data layers. The holographic disk is configured to store a plurality of micro-holograms formed as a result of illumination by the interference pattern created by counter-propagating overlapping beams.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more embodiments of the present techniques will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for one of ordinary skill having the benefit of this disclosure.

Figure 1:
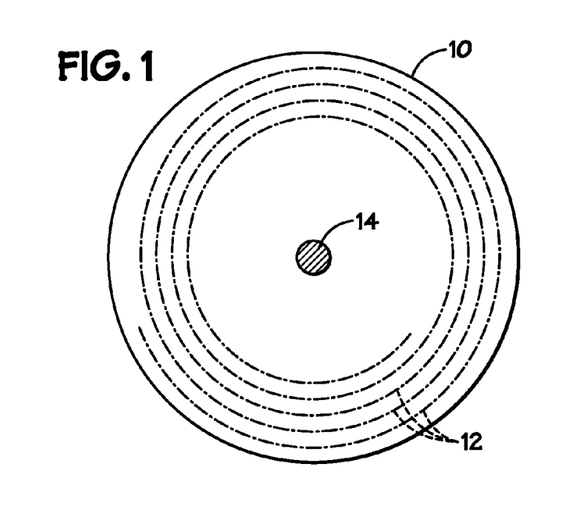
FIG. 1 illustrates an optical disk having data tracks, in accordance with embodiments.

Bit-wise holographic data storage systems typically involve recording by emitting two overlapping and interfering beams inside a recording medium (e.g., a holographic disk). Data bits are represented by the presence or absence of microscopically sized localized holographic patterns, referred to as micro-holograms, which act as volumetric light reflectors when illuminated by a focused beam. For example, the holographic disk 10 illustrated in FIG. 1 represents how data bits may be organized in a layer of the disk 10. Generally, the holographic disk 10 is a substantially planar, round disk with one or more data storage layers embedded in a transparent plastic film. The data layers may include any number of modified regions of the material substantially localized in depth that may reflect light, such as the micro-holograms used for a bit-wise holographic data storage. In some embodiments, the data layers may be embedded in the holographic recordable material which is responsive to the power (e.g., illumination intensity) of the light beams impinged on the disk 10. For example, in different embodiments, the disk 10 materials may be threshold responsive or linearly responsive. The data layers may be between approximately 0.05 µm to 5 µm in thickness and may have a separation between approximately 0.5 µm to 250 µm.

Data in the form of micro-holograms may be generally stored in a sequential spiraling track 12 from the outer edge of the disk 10 to an inner limit, although concentric circular tracks, or other configurations, may be used. A spindle hole 14 may be sized to engage about a spindle in a holographic system, such that the disk 10 may be rotated for data recording and/or reading.

Figure 2A:
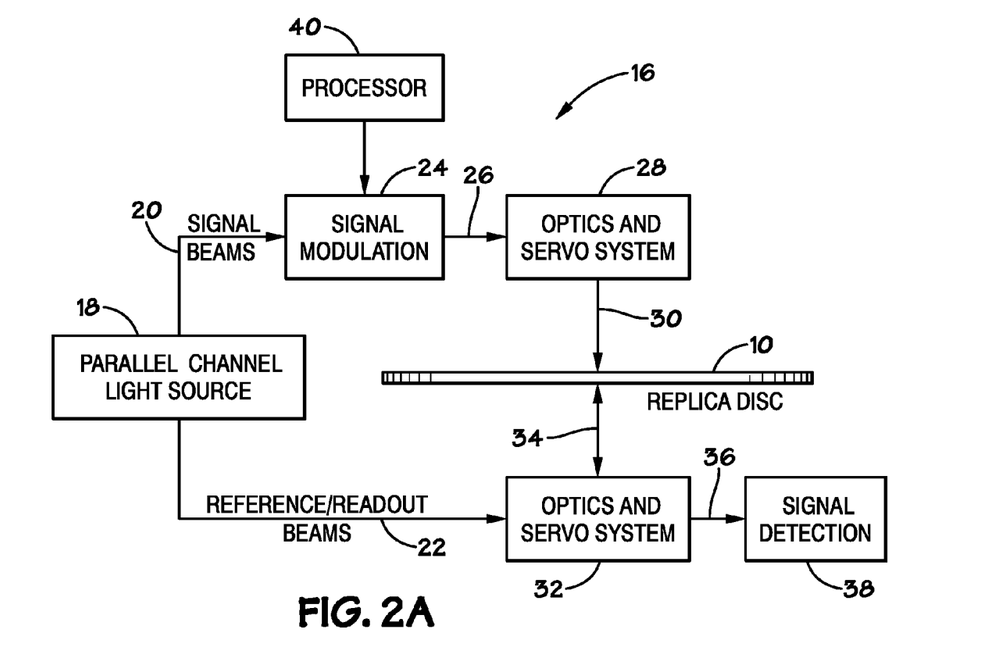
FIGS. 2A and 2B are block diagrams of micro-holographic replication systems, in accordance with embodiments.

A general system of recording micro-holograms to a holographic disk 10 is provided in the block diagram of FIG. 2A. The holographic system 16 includes a light source 18 which may be split into a signal beam 20 and a reference beam 22. As will be discussed, in some embodiments, the light source 18 (which may be a single light source or multiple single-mode polarized light sources) may emit multiple nearly parallel light beams to be recorded over parallel tracks 12 in a disk 10. The multiple source beams may also be split into multiple signal beams 20 and multiple reference beams 22. The signal beams 20 may be modulated (block 24) according to the data to be recorded on the disk 10. In some embodiments, a processor 40 may control the modulation (block 24) of the signal beams 20. The modulated signal beams 26 may be passed through an optics and servo-mechanic system 28, which may include various optical and servo-mechanic devices configured to focus the focused signal beams 30 on a particular location of the disk 10. For example, the optics and servo-mechanic system 28 may focus the focused signal beams 30 to a particular data layer or data tracks 12 in the disk 10.

The reference beams 22 may also be passed through an optics and servo-mechanic system 32 including various optics and servo-mechanic devices designed to focus the focused reference beams 34 to a particular data layer or data tracks 12 in the disk 10, such that the focused reference beams 34 overlap with the focused signal beams 34. Micro-holograms may be recorded in the holographic disk 10 in illuminated spots of an interference pattern formed by the two overlapping counter-propagating focused laser beams 30 and 34. In some embodiments, recorded micro-holograms may be retrieved from the disk 10 using the focused reference beams 34. Reflections of the focused reference beams 34, referred to as the data reflections 36, may be received at a detector for signal detection 38.

A stream of multiple micro-holograms may be recorded over a track 12 of the disk 10 by maintaining the overlapping counter-propagating focused beams to the desired track while rotating the disk 10 about a spindle positioned through the spindle hole 14. Generally, a certain degree of overlap of the counter-propagating beams is maintained to ensure that micro-holograms are accurately recorded in the appropriate track 12 and/or layer of the holographic disk 10. The optical and servo-mechanic systems 28 and 32 may be utilized to maintain a desired overlap dynamically with disk rotation during a micro-hologram recording process.

Such optical and servo-mechanical components 28 and 32 may add to the complexity of an end-user device for recording a holographic disk 10. The present techniques provide methods and systems for pre-formatting and/or pre-populating a holographic disk 10 with micro-holograms such that the disk 10 may be modified and/or erased by an end-user device using a single beam exposure. Pre-populating a holographic disk may refer to the pre-recording of micro-holograms during a manufacturing process of the holographic disk 10. The micro-holograms recorded during the pre-populating process may represent code, address, tracking data, and/or other auxiliary information. The pre-recorded micro-holograms may be subsequently modified and/or erased using a single beam rather than overlapping counter-propagating beams. Thus, an end-user system need not maintain overlapping counter-propagating laser beams to record data to a pre-populated holographic disk. Instead, an end-user system using a single-sided beam or beams may be used to record data by modifying and/or erasing micro-holograms on the pre-populated holographic disk.

While recording micro-holograms with counter-propagating beams to pre-populate a holographic disk may decrease the complexity of micro-hologram modification for an end user device, the process of pre-populating the disk may also be improved in accordance with the present techniques. As discussed, when pre-populating the holographic disk 10, the disk 10 is rotated in the holographic system such that the overlapping counter-propagating beams directed to the disk 10 may record micro-holograms over a selected track 12 and/or layer of the disk 10. The rotation speed of the disk 10, which is limited in part by the mechanical strength of the disk material, limits the speed (referred to as the transfer rate) at which micro-holograms can be recorded. For example, a typical disk rotation speed of a Blu-ray Disc™ may result in a transfer rate in a single-channel system of approximately 430 Mbits/second at 12×BD rate. At this transfer rate, the recording time per data layer in the disk is approximately 500 seconds.

In one or more embodiments, parallel micro-hologram recording techniques may be used to increase the transfer rate and reduce the recording time for a holographic disk 10. For example, parallel micro-hologram recording may involve directing multiple beams to a holographic disk to illuminate more than one track 12 in the disk 10. A beam may refer to a collection of light propagating in substantially the same direction through the same set of optical elements, and may include light originated from different light sources. Multiple beams may also be directed to more than one track 12 of the disk 10 from an opposite direction (i.e., counter-propagating beams) such that multiple overlapping counter-propagating beams may create an interference pattern of multiple illumination spots which result in multiple recorded micro-holograms in parallel tracks 12 of the disk 10. Furthermore, in some embodiments, the overlapping beams may interfere at a focused spot having a relatively small area with respect to the data layer plane. The focused illumination spots of the interference pattern may be separated by non-illuminated regions. By limiting the illuminated areas on a data layer, the depth spread of recorded micro-holograms may be limited to a desired size and/or limited on a desired data layer (e.g., between approximately 0.05 µm to 5 µm).

Figure 2B:
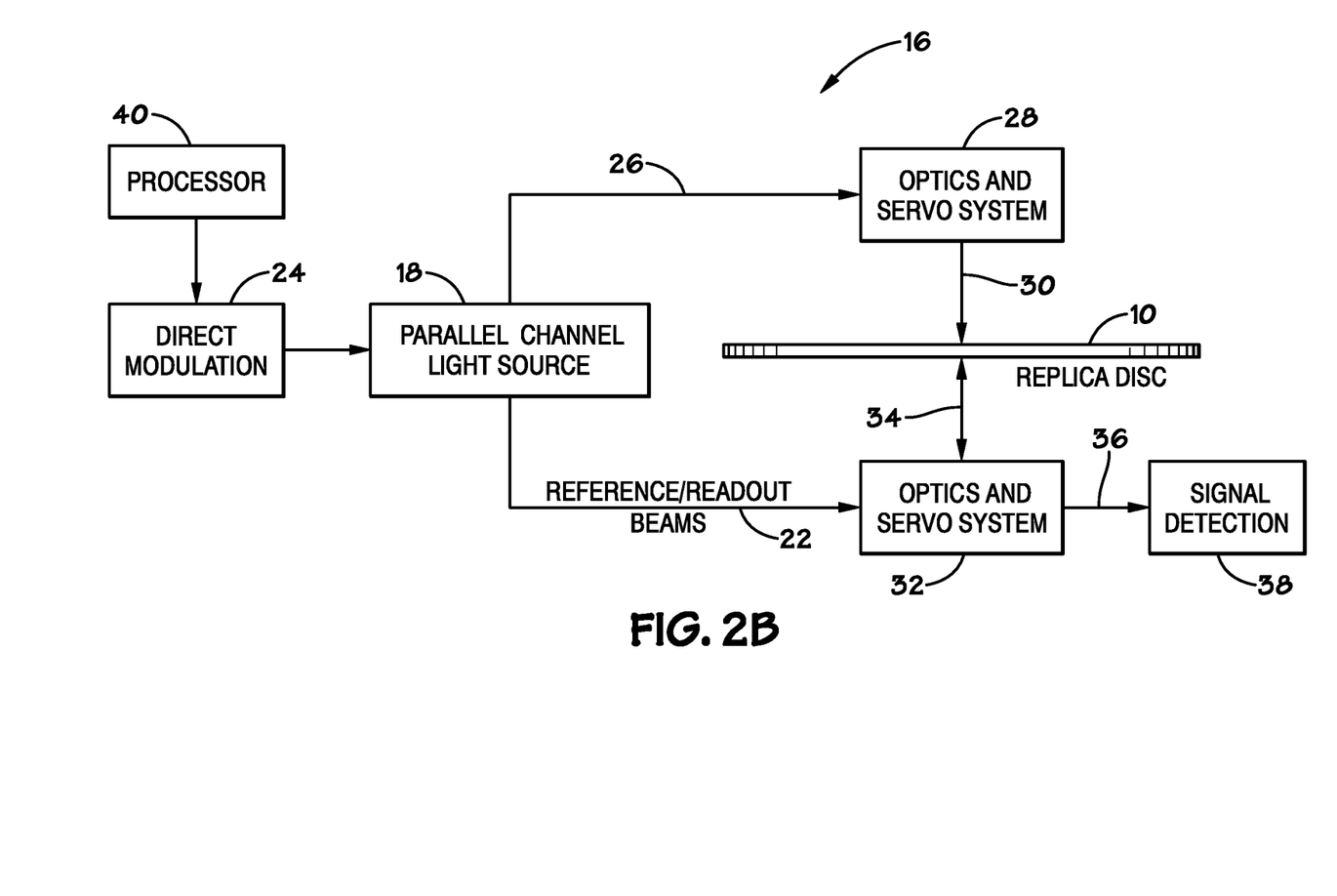

Furthermore, as provided in FIG. 2B, one or more embodiments of replication systems involve the direct modulation of the parallel channel light source 18. For example, the parallel channel light source 18 may be coupled to a modulator 24 suitable for directly modulating the parallel channel light source 18. The modulator 24 may be controlled by a processor 40 and may modulate the parallel channel light source 18 such that the modulated signal beams 26 emitted by the parallel channel light source 18 include the information to be recorded on the replica disk 10. Further details of this embodiment will be discussed with respect to FIG. 8.

Figure 3A:
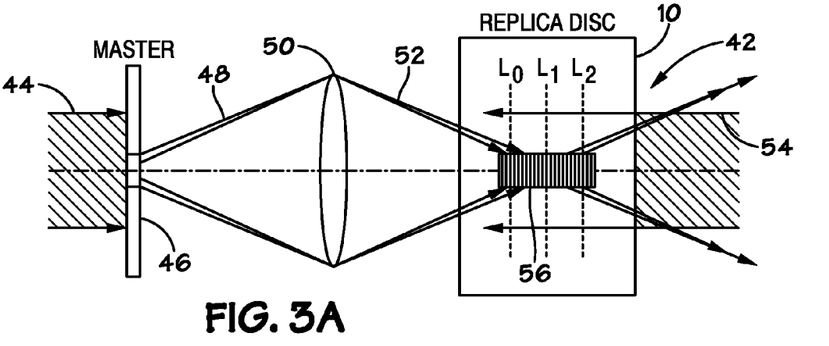
FIGS. 3A and 3B illustrate two schematic diagrams comparing a single beam replication technique and a multiple parallel beams replication technique, in accordance with embodiments.
Figure 3B:
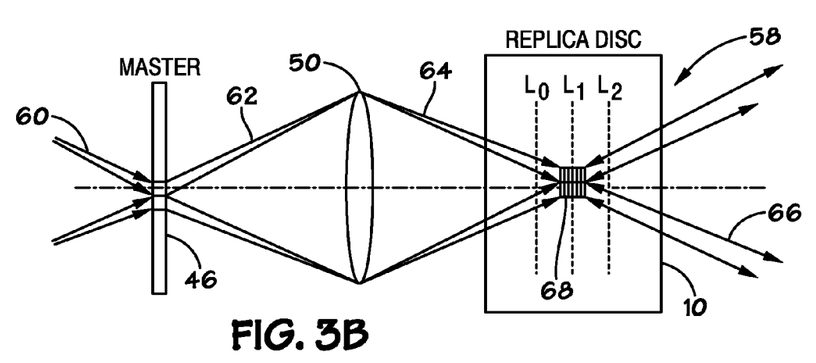

The two schematic diagrams in FIGS. 3A and 3B compare two different approaches to recording micro-holograms in parallel. The wide field illumination using a single beam approach 42 includes using a single beam 44 to illuminate a relatively wide field (e.g., spanning multiple data tracks 12) in a master disk 46. The master disk 46 may contain data to be replicated onto the replica disk 10, and spanning multiple data tracks 12 with the single beam 44 may allow data on multiple data tracks 12 to be replicated concurrently. The modulated beams 48 transmitted through or reflected from the master disk 46 may be transmitted through an optical imaging system 50, represented as a lens in FIG. 3A, which may focus the reflections 48 and direct the focused reflections 52 to the replica disk 10. A single wide field reference beam 54 may also be directed to the opposite side of the replica disk 10, such that the focused reflections 52 and the reference beam 54 may counter-propagate and interfere to form a hologram pattern 56. The replica disk 10 may have multiple data layers, as represented by the vertical lines $L_0$, $L_1$, and $L_2$.

However, the increased field of view of the illumination of the single beams 44 and 54 generally results in an increased depth spread of the recorded hologram in the replica disk 10. The increased depth spread characteristic may refer to an increased size of a hologram which may span through a greater thickness of the disk 10 (in the direction of the single beams 44 and 54) and may span through more than one layer. For example, while the single beams 44 and 54 may both be directed to layer $L_1$, the intensity of recording light may be substantially high such that the linear material typically used for such page-based wide field illumination systems may be relatively sensitive to the wide illumination field, and the materials in adjacent layers $L_0$ and $L_2$ may also be affected by the single beams 44 and 54. Thus, increased depth spread in hologram recording may limit or decrease the data capacity of the holographic disk 10, as recording one holographic pattern may consume more than one data layer.

One embodiment of the present techniques is presented in the multiple parallel beam approach 58. Rather than illuminating a relatively wide field with a single beam, as in the single beam approach 42, the multiple beam approach 58 involves impinging a holographic disk 10 with multiple counter-propagating beams. In one embodiment, multiple signal beams 60 are directed to a master disk 46. Each beam may be focused on one track 12, and the transmissions 62 (or reflections, depending on different system designs) from the master disk 46 may be transmitted through an optical imaging system 50, represented as a lens in FIG. 3B, which may image the transmissions 62 to the replica disk 10.

Multiple reference beams 66 may also be directed to the opposite side of the disk 10. In some embodiments, the reference beams 66 and the signal beams 60 may be split from a common parallel channel light source 18 (FIGS. 2A and 2B), and in some embodiments, the multiple reference beams 66 (and thus the multiple signal beams 60) may be transmitted from different single-mode polarized light sources. The parallel reference beams 66 and the transmission image 64 may counter-propagate and interfere to form an interference pattern on a data layer (e.g., data layer $L_1$) in the disk 10. The interference pattern may include multiple illumination spots (e.g., each spot may correspond to the interference of one pair of counter-propagating beams in parallel beam channels) separated by non-illuminated regions. Each of the interference spots may form a micro-hologram 68 in the data layer $L_1$. Because only a small fraction of the data layer plane in a data layer $L_1$ is illuminated with respect to the area of the whole data layer plane (rather than a wide region in the single beam approach 42), each of the beam spots (or micro-holograms 68) in the illumination pattern may be relatively focused within a single data layer $L_1$, potentially increasing the data capacity of the disk 10.

Figure 4:
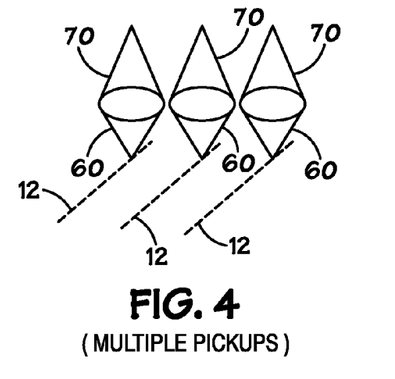
FIG. 4 is a schematic diagram of a multi-head system recording on multiple tracks of a holographic disk in parallel, in accordance with embodiments.

In some embodiments, using multiple parallel beams for parallel micro-hologram recording may utilize multiple optical heads, as illustrated in FIG. 4. The optical heads 70 may emit a single beam, and multiple optical heads 70 in a replication system 16 (e.g., FIGS. 2A and 2B) may be arranged to each impinge a beam 60 over a data track 12 in the disk 10, such that multiple beams 60 are illuminating multiple tracks 12 in parallel. In some embodiments, each optical head may have separate optics configured to focus the beam 60 on a track 12. Further, an additional set of optical heads may be configured to impinge the disk 10 from an opposite direction, such that the parallel beams 60 emitted from each optical head 70 counter-propagate to interfere in the data tracks 12 in one layer of the disk 12.

Figure 5:
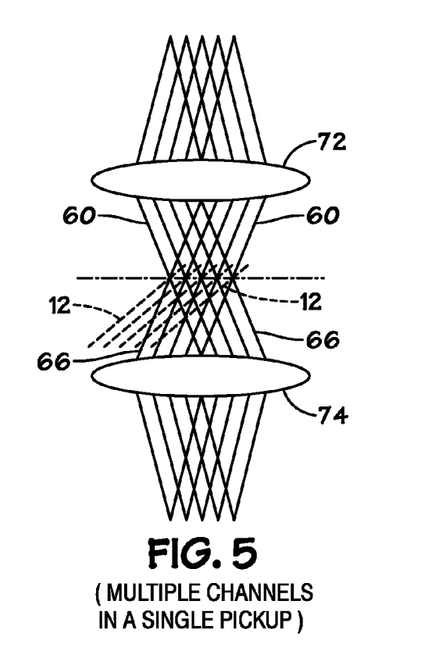
FIG. 5 is a schematic diagram of a single head transmitting multiple beams to record on multiple tracks of a holographic disk in parallel, in accordance with embodiments.

In another embodiment illustrated in FIG. 5, parallel micro-hologram recording using multiple parallel beams may utilize an optical head 72 which transmits multiple beams 60 of light in parallel, from one set of optics. In one embodiment, the multiple signal beams 60 from a single optical head 72 may be transmitted through a bundle of individual fibers suitable for transmitting a beam of light, such that each beam is discrete as it is transmitted out of the optical head 72 and onto multiple tracks 12 of a disk 10. Counter-propagating parallel signal beams 60 may be achieved by transmitting counter-propagating beams 66 from another optical head 74 on the opposite side of the disk 10 or by splitting multiple beams into multiple signal beams 60 and multiple reference beams 66 (as discussed with respect to FIGS. 2A and 2B).

Embodiments of the present techniques may include various system configurations. Examples of different holographic replication system configurations capable of parallel micro-hologram recording using counter-propagating beams are provided in FIGS. 6-8. The embodiments illustrated in FIGS. 6-8 may be more detailed drawings of embodiments previously discussed in FIGS. 1-5.

Figure 6:
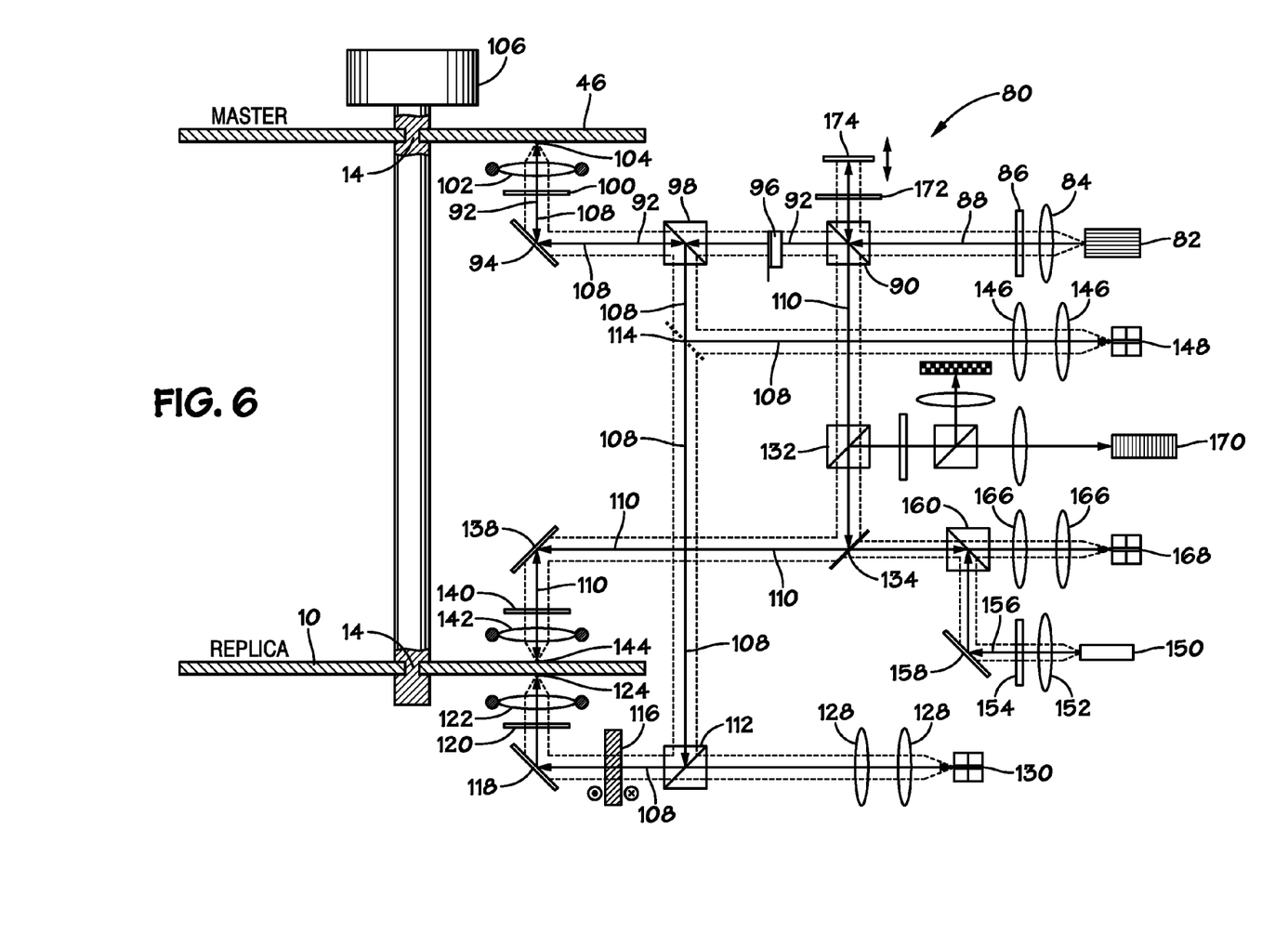
FIG. 6 is a schematic diagram of a micro-holographic replication system utilizing a reflective master modulation, in accordance with embodiments.

FIG. 6 is a schematic diagram illustrating a holographic replication system for parallel micro-hologram recording configured to replicate data retrieved from a master disk. As discussed, the master disk 46 and the replica disk 10 may each have multiple data layers (e.g., $L_0$, $L_1$, $L_2$, etc., as in FIG. 3), and each data layer may have multiple data tracks 12 (as in FIG. 1). The master disk 46 and the replica disk 10 may be rotated about their spindle holes 14 by a spindle 106 of the replication system 80. The rotation of the master disk 46 may allow data in the form of micro-holograms to be retrieved from multiple data tracks 12 in parallel, to be recorded on multiple data tracks 12 of the rotating replica disk 10, in parallel.

The replication system 80 may emit parallel beams of light from a parallel channel light source 82. For example, the light source 82 may transmit parallel source beams 88 having a wavelength of approximately 405 nm. In some embodiments, different wavelengths of light may be used, and in some embodiments, the light source 82 may transmit beams with modulated intensities at multiple wavelengths. The light source 82 may transmit the parallel source beams 88 through various optical devices, such as the lens 84 and the half wave plate 86, which may rotate the polarization of each of the parallel source beams 88. Part of the multiple source beams 88 are transmitted through the polarizing beam splitter 90 and become multiple signal beams 92. Part of the multiple source beams 88 may also be reflected 90° by the polarizing beam splitter 90 towards a quarter wave plate 172 and a mirror 174. The mirror 174 may be on a translation stage that can move the mirror forward or backward. When portions of the parallel source beams 88 pass through the quarter wave plate 172 and are reflected by the mirror 174 to pass the quarter wave plate 172 a second time, the beams 88 are rotated in polarization by 90° and transmitted through the polarizing beam splitter 90 and become reference beams 110.

The parallel signal beams 92 may pass a shutter 96 which may be open at recording and closed at readout. The parallel signal beams may be propagated to a second polarizing beam splitter 98 which may pass the signal beams 92 to be reflected by the mirror 94 towards the master disk 46. The signal beams 92 may first pass a second quarter wave plate 100 and an optical, mechanical and electronic system 102 which may include various optical elements suitable for focusing the parallel signal beams 92 on the master disk 46. The focused signal beams 104 may be impinged on multiple tracks 12 on the master disk 46.

Data (e.g., in the form of micro-holograms) in the master disk 46 may reflect portions of the beams 104 which represent data on the impinged tracks 12 of the master disk 46. The reflected signal beams 108 may be transmitted through the optical head 102 and the quarter wave plate 100 and reflected by the mirror 94 to the polarizing beam splitter 98. As the reflected signal beams 108 have been rotated in polarization by 90° (after two passes through the quarter wave plate 100) since the parallel beams last passed the polarizing beam splitter 98, the reflected signal beams 108 may be reflected by the polarizing beam splitter 98 to a third polarizing beam splitter 112 which reflects the reflected signal beams 108 by 90°. The parallel data beams 114 may pass through various optical elements toward the replica disk 10. For example, in one embodiment, the reflected signal beams 108 may pass through a one-dimensional retro-reflector 116 which changes the orientation of the beams 108 during transmission. The signal beams 108 may be reflected by a mirror 118 and a quarter wave plate 120 and the optical head 122 (e.g., a lens or other optical, electronic, and mechanical components), and the focused parallel signal beams 124 may be impinged on the replica disk 10.

In one embodiment, the previously split parallel reference beams 110 may be directed to an opposite side of the replica disk 10. The parallel reference beams 110 may be reflected by various elements (e.g., a dichroic filter 134 and a mirror 138) to pass through a quarter wave plate 140 and the optical head 142 which may include other optical components to focus and transmit the beams, such that the focused reference beams 144 may be impinged on the replica disk 10 from an opposite side as the focused parallel signal beams 124. The beams 124 and 144 may be counter-propagating, and may substantially overlap over multiple parallel tracks of the replica disk 10. The beams 124 and 144 may have a similar power (e.g., similar intensity distributions) and may create an interference pattern to record micro-holograms over multiple parallel tracks 12. Further, the simultaneously recorded micro-holograms may belong to one or multiple data layers of the replica disk 10.

The holographic replication system 80 may have various servo-mechanic components suitable for maintaining the location of an optical head 102, 122, and 142 with respect to a disk 46 and 10. For example, the system 80 may include a servo-mechanical device 148 for controlling the position of the optical head 102 emitting the focused signal beam 104 onto the master disk 46. The servo-mechanical device 148 may use error-sensing feedback to determine whether the focused signal beam 104 is out of focus, is focused on an unintended data track 12, or is recording to an unintended data layer, for example. The error may be detected by sampling the reflected signal beams 108 using a sampler 114. The sampled beam may pass through various optical devices 146 before transmission to the servo-mechanical device 148. If the servo-mechanical device 148 detects an error, the position of the optical head 102 may be adjusted. Similarly, the system 80 may include a servo-mechanical device 130 for controlling the position of the optical head 122 which transmits the focused signal beam 124 to the replica disk 10. If the servo-mechanical device 130 detects an error, the position of the optical head 122 may be adjusted.

Furthermore, the system 80 may include devices for controlling the position of the optical head 142. For example, the system 80 may include a light source 150 which transmits a beam 156 to be directed through the optical head 142 onto the replica disk 10. The beam 156 may pass though optical devices which focus and direct the path of the beam 156, such as the lens 152, the half wave plate 154, the mirror 158, and the polarizing beam splitter 160. The reflection of the beam 156 from the disc 10 may be directed through other optical devices 166 to the servo-mechanical device 168. Since the beam 156 is emitted from the same optical head 142 as the parallel reference beams 110, the reflection of the beam 156 may indicate whether the optical head 142 is focused on the appropriate data track 12 and/or data layer. Further, the light source 150 may emit a beam having a different wavelength (e.g., 650 nm) such that the reflection of the beam 156 may be distinguishable from the reference beam 110.

Figure 7:
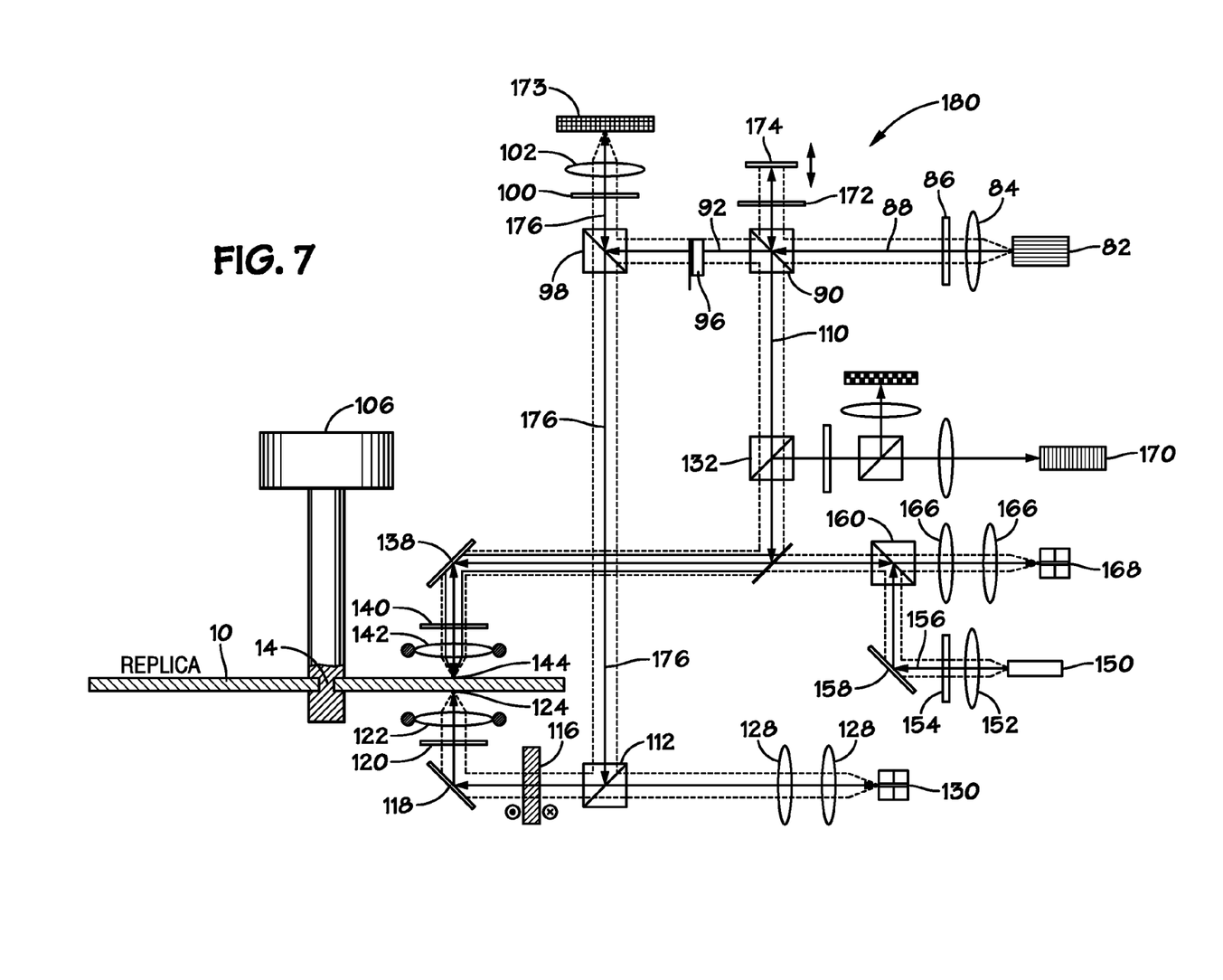
FIG. 7 is a schematic diagram of a micro-holographic replication system utilizing a spatial light modulator, in accordance with embodiments.

While the system 80 discussed in FIG. 6 involves using a master disk 46 to replicate data onto a replica disk 10, in some embodiments, micro-holograms may be recorded onto the replica disk 10 using spatial light modulation of the parallel signal beams. As illustrated in FIG. 7, the system 180 includes a similar configuration to the system 80 using the master disk 46. However, rather than using beam reflections of the master disk 46 to record micro-holograms on the replica disk 10, the system 180 includes a spatial light modulator 173 to directly modulate the parallel source beams 88 emitted by the light source 82. The spatial light modulator 173 may be controlled by a processor 40 (as in FIG. 1) to modulate the parallel source beams 88 such that the modulated parallel beams 176 can be directed to the replica disk 10 to overlap with the reference beam 110 to record the appropriate data represented by micro-holograms in parallel tracks 12 of the disk 10. For example, the spatial light modulator 173 may be a multi-element light modulator, such as an electro-optic spatial light modulator or a magneto-optic spatial light modulator, suitable for modulating the parallel source beams 88 concurrently. The spatial light modulator 173 may be suitable for modulating the power and/or intensity of each of the parallel signal beams 92 to illuminate spots on the replica disk 10 at different intensities. The different intensities of illuminated spots may represent data, such as coded data, data addresses, and/or other auxiliary information.

Figure 8:
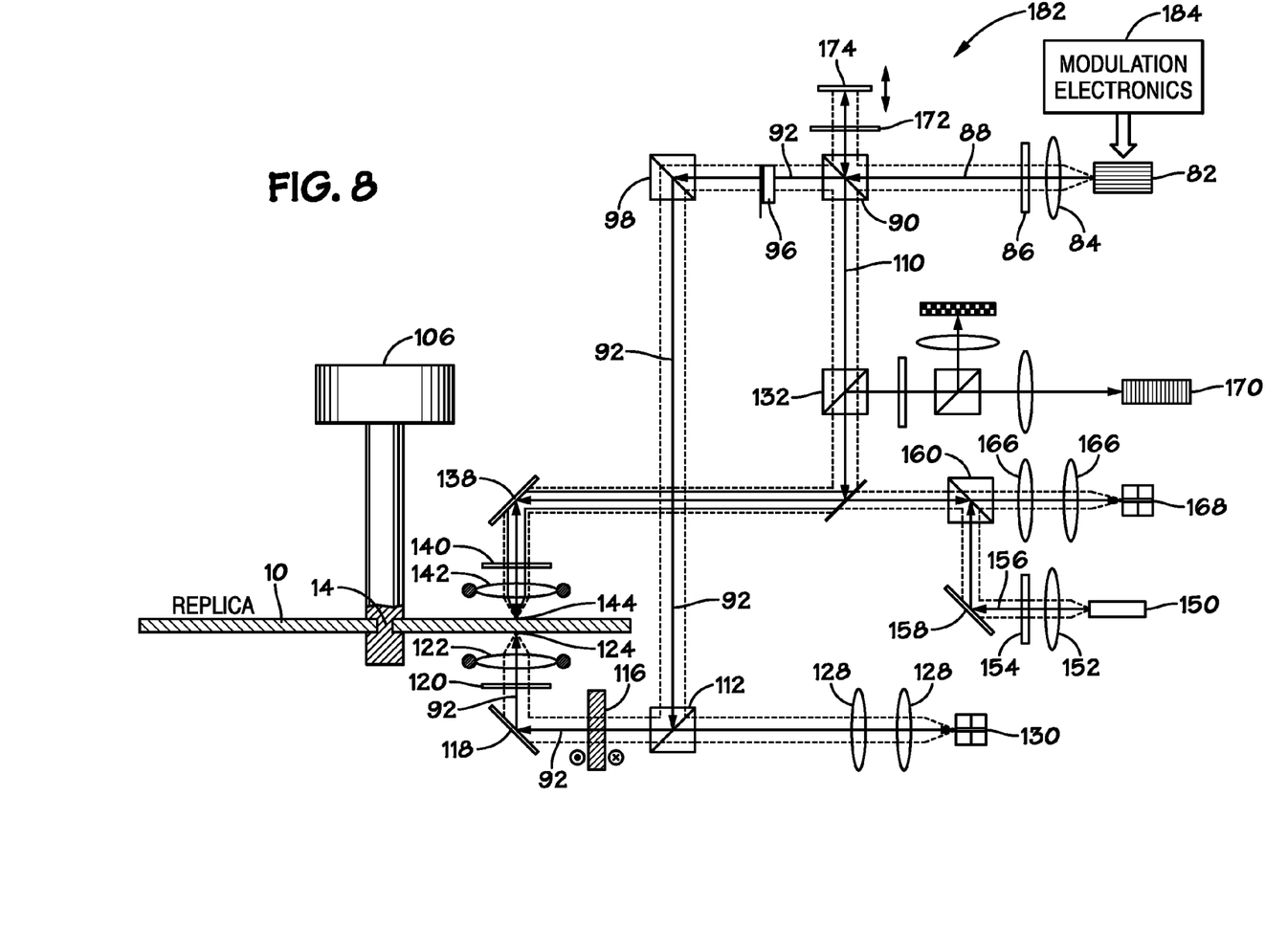
FIG. 8 is a schematic diagram of a micro-holographic replication system utilizing a direct modulation of light sources, in accordance with embodiments.

In some embodiments, such as in the system 182 illustrated in FIG. 8, modulation electronics 184 may be included in the light source 82. Thus, the source beams 88 transmitted from the light source 82 may already be modulated for recording the appropriate data over parallel tracks 12 of the disk 10. The modulation of the source beams 88 for some embodiments may involve time-multiplexed intensity modulation, such that the power of the modulated signal beams 92 may form illumination spots having different powers (e.g., different intensities) over the data tracks 12 of the replica disk 10.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of recording data on a holographic disk, comprising:
   emitting a plurality of discrete signal beams through a bundle of fibers of a first optical head toward a first side of the holographic disk; and
   emitting a plurality of discrete reference beams through a bundle of fibers of a second optical head toward a second side of the holographic disk such that each signal beam in the plurality of discrete signal beams substantially overlaps with a corresponding reference beam in the plurality of discrete reference beams, wherein the first side and the second side are on opposite sides of the disk, and wherein the substantial overlap of each signal beam in the plurality of discrete signal beams with each corresponding reference beam in the plurality of discrete reference beams results in recording micro-holograms over a plurality of data tracks in the holographic disk.

2. The method of claim 1, wherein the substantial overlap of each signal beam in the plurality of discrete signal beams with each corresponding reference beam in the plurality of discrete reference beams forms a micro-hologram in the holographic disk.

3. The method of claim 1, wherein the substantial overlap of each signal beam in the plurality of discrete signal beams with each corresponding reference beam in the plurality of discrete reference beams results in an interference pattern limited to approximately one data layer in the holographic disk.

4. The method of claim 1, comprising rotating the holographic disk such that the substantial overlap of each signal beam with each corresponding reference beam records micro-holograms on and along a data track in the holographic disk.

5. The method of claim 1, comprising modulating a plurality of source beams to generate the plurality of discrete signal beams.

6. The method of claim 5, wherein modulating a plurality of source beams comprises emitting the plurality of source beams toward a master disk, wherein the plurality of discrete signal beams comprise reflections or transmissions of the plurality of source beams from the master disk.

7. The method of claim 5, wherein modulating the plurality of source beams comprises varying a power of one or more of the plurality of source beams.

8. The method of claim 7, wherein varying the power of one or more of the plurality of source beams comprises direct current modulation of one or more of the light sources.

9. The method of claim 7, wherein varying the power of each of the parallel source beams represents one or more of coded data, data address, and other auxiliary information.

10. The method of claim 1, wherein emitting the plurality of discrete signal beams comprises emitting each of the plurality of discrete signal beams from the first optical head.

11. The method of claim 1, wherein emitting the plurality of discrete signal beams comprises emitting each of the plurality of discrete signal beams from more than one optical head.

12. The method of claim 1, wherein emitting the plurality of discrete reference beams comprises emitting each of the plurality of discrete reference beams from the second optical head.

13. The method of claim 1, wherein emitting the plurality of discrete reference beams comprises emitting each of the plurality of discrete reference beams from more than one optical head.

14. The method of claim 1, wherein the plurality of discrete signal beams and the plurality of discrete reference beams are split from a plurality of source beams.

15. The method of claim 14, wherein the plurality of source beams is generated from one laser or a plurality of lasers.

16. The method of claim 1, comprising controlling an overlap of the plurality of discrete signal beams and the plurality of discrete reference beams to form a plurality of data tracks in the holographic disk using one or more servo-mechanical devices.

17. A method of recording data on a holographic disk, comprising:
   emitting a plurality of signal beams toward a first side of the holographic disk; and
   emitting a plurality of reference beams toward a second side of the holographic disk such that each signal beam in the plurality of signal beams substantially overlaps with a corresponding reference beam in the plurality of reference beams, wherein the first side and the second side are on opposite sides of the disk, wherein the substantial overlap of each signal beam in the plurality of signal beams with each corresponding reference beam in the plurality of reference beams results in recording micro-holograms over a plurality of data tracks in the holographic disk, and wherein the substantial overlap of each signal beam in the plurality of signal beams with each corresponding reference beam in the plurality of reference beams results in an interference pattern of a plurality of interference patterns substantially simultaneously recorded in multiple data layers of the holographic disk.

18. A system for recording micro-holograms on a holographic disk, the system comprising:
one or more signal optical heads configured to transmit a plurality of discrete signal beams through a bundle of fibers of the one or more signal optical heads towards a first side of the holographic disk; and
one or more reference optical heads configured to transmit a plurality of discrete reference beams through a bundle of fibers of the one or more reference optical heads towards a second side of the holographic disk, wherein the first side is opposite from the second side, and wherein each signal beam of the plurality of discrete signal beams substantially overlaps with each corresponding reference beam of the plurality of discrete reference beams to record micro-holograms over a plurality of data tracks in the holographic disk.

19. The system of claim 18, comprising one or more source heads configured to transmit a plurality of source beams towards a master disk and configured to receive a reflection or transmission of the plurality of source beams from the master disk, wherein the plurality of discrete signal beams comprises the reflection or transmission.

20. The system of claim 18, comprising a multi-element light modulator configured to modulate a power of each of a plurality of source beams, wherein the plurality of discrete signal beams comprises the modulated plurality of source beams.

21. The system of claim 18, wherein the one or more signal optical heads comprises one signal optical head configured to transmit the plurality of discrete signal beams.

22. The system of claim 18, wherein the one or more signal optical heads comprises multiple signal optical heads configured to transmit the plurality of discrete signal beams.

23. The system of claim 18, comprising one laser configured to generate a plurality of source beams for the one or more signal optical heads and the one or more reference optical heads.

24. The system of claim 23, wherein the plurality of source beams generated by the one laser each comprise a wavelength of approximately 405 nm.

25. The system of claim 18, comprising a plurality of lasers configured to generate a plurality of source beams for the one or more signal optical heads and the one or more reference optical heads.

26. The system of claim 25, wherein each laser of the plurality of lasers generate a beam comprising a wavelength of approximately 405 nm.

27. The system of claim 18, comprising a set of one or more optical heads configured to read data recorded in the holographic disk.

* * * * *